United States Patent [19]

Keeton

[11] Patent Number: 5,425,318

[45] Date of Patent: Jun. 20, 1995

[54] RESILIENT SEED FIRMING ATTACHMENT FOR A PLANTING MACHINE

[75] Inventor: Eugene G. Keeton, Trenton, Ky.

[73] Assignee: J & K Keeton Enterprises, Inc., Moline, Ill.

[21] Appl. No.: 195,625

[22] Filed: Feb. 14, 1994

[51] Int. Cl.⁶ .............................................. A01C 5/00
[52] U.S. Cl. ..................................... 111/197; 111/189
[58] Field of Search ................. 111/189, 197, 198, 150

[56] References Cited

FOREIGN PATENT DOCUMENTS 3441610 5/1986 Germany.

Primary Examiner—Dennis L. Taylor
Assistant Examiner—Spencer Warnick
Attorney, Agent, or Firm—Rockey Rifkin & Ryther

[57] ABSTRACT

A resilient seed firming attachment for a planting machine designed to effectively place seed at a consistent depth and at consistent spacing. The attachment may be of any geometrical configuration having a length adequate to firm the seed in the opened furrow and is mounted in a position trailing the discharge end of a seed boot. The resilience of the seed firming attachment being variable and having a control mechanism to ensure that sufficient force is applied to the seed to firm it into the soil at the desired planting depth. By controlling the amount of flex, the proper seed planting depth and firming will be accomplished in a variety of soil and moisture conditions. The seed firming device is also variable so that the amount of down pressure will not modify the depth desired and obtained by the furrow opening device.

13 Claims, 2 Drawing Sheets

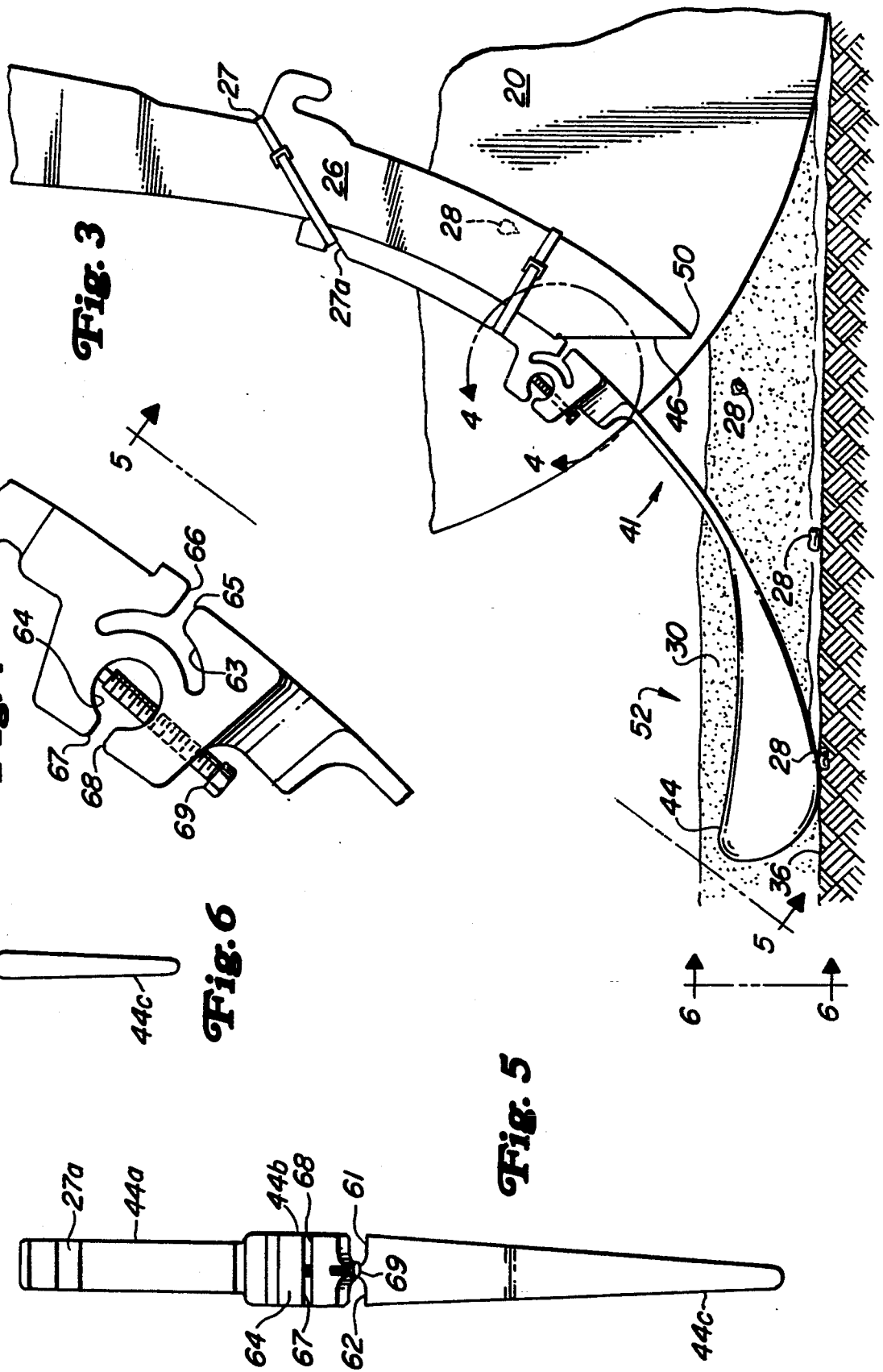

RESILIENT SEED FIRMING ATTACHMENT FOR A PLANTING MACHINE

BACKGROUND OF THE INVENTION

1) Field of the Invention

The present invention relates to planting implements and more specifically to an attachment to a planter seed boot to improve seed depth and spacing.

2) Related Art

It is well-known that for optimum seed germination the kernels must be placed at the proper soil depth, where the seed will receive the correct moisture and temperature. Test results indicate that emerging short plants may be from seeds planted at deeper depths which has retarded their emergence, while seeds planted too shallow will not properly germinate and emerge due to dry soil conditions at shallower depths. Other problems occurring with current high speed planting techniques are seed bounce and undesired soil residuals and/or air pockets within and at the bottom of the opened furrow, both which not only effect proper seed spacing but also seed depth.

Many devices have been utilized to correct the aforementioned problems. One such device is disclosed in U.S. Pat. No. 5,092,255 Long et al. in which a strap is employed to prevent the seeds from bouncing out of the furrow. Although this invention may reduce the seed bounce problem, the strap configuration is designed to operate above the seeds in the furrow and does not conform or touch to the "V" groove furrow obtained by the opening device. Other inventions disclose the use of baffles to reduce the problem of seed bounce such as disclosed in U.S. Pat. No. 4,669,922 Hooper et al. Another invention disclosed the use of loosely joined plates, U.S. Pat. No. 4,253,412 Hogenson, to deflect the seed to the lowermost portion of the opened furrow.

Although these and other inventions seek ways to reduce seed bounce, none offer a device for firming the kernel into the soil at the optimum depth or firm the seed at the desired planting depth as determined by the setting of the opener while at the same time reduce seed bounce. Residual soil in the furrow causing undesired air pockets under the kernel are eliminated if the seed firming attachment firmly presses the kernel into the bottom of the furrow. Such a device is described and claimed in my co-pending application Ser. No. 08/137,844. This invention is an improvement over my earlier seed firming attachment or device as this improvement provides control of the pressure applied to the seed to accurately firm the seed to maximize emergence under various soil and moisture conditions. Soil and moisture conditions may vary considerably at the time of planting.

BRIEF SUMMARY OF THE INVENTION

It is therefore an object of the present invention to provide a device which will reduce seed bounce and direct the seed to the bottom of the furrow. Another object of the present invention is to provide a resilient device which firms the kernel or seed into the soil at the bottom of the opened furrow thereby reducing air pockets. It is another object of the invention to provide a seed firming attachment which can be readily attached to an existing planter assembly or seed boot. Another object is to provide a seed firming attachment which is low in cost to manufacture, resistant to wear and soil build-up. Another object of the present invention is to provide a resilient seed firming device which has sufficient stiffness so as to compact loose soil residual accumulated at the bottom of an opened furrow while not altering the furrow depth. It is a further object of this invention to provide variable but controlled stiffness or resilience so as to provide proper down pressure on the seed to accomplish the above objects of seed firming under various soil and moisture conditions.

Another object of this improved seed firming device is so provide lateral flexibility of the firming device to permit the seed firming device to remain in the bottom of the furrow while conforming to the lateral variations in the furrow.

BRIEF DESCRIPTION OF THE DRAWINGS

FIG. 3—is a large cross-sectional view of the furrow opening device depicting the resilient seed firming unit of this invention interacting with seed in the open furrow.

FIG. 4—is a cross-sectional view taken along line 4—4 of FIG. 3.

FIG. 5—is a top view taken along line 5—5 of FIG. 3.

FIG. 6—is an end cross-sectional view taken along lines 6—6 of FIG. 3.

DETAILED DESCRIPTION OF THE DRAWINGS

Figure 1:
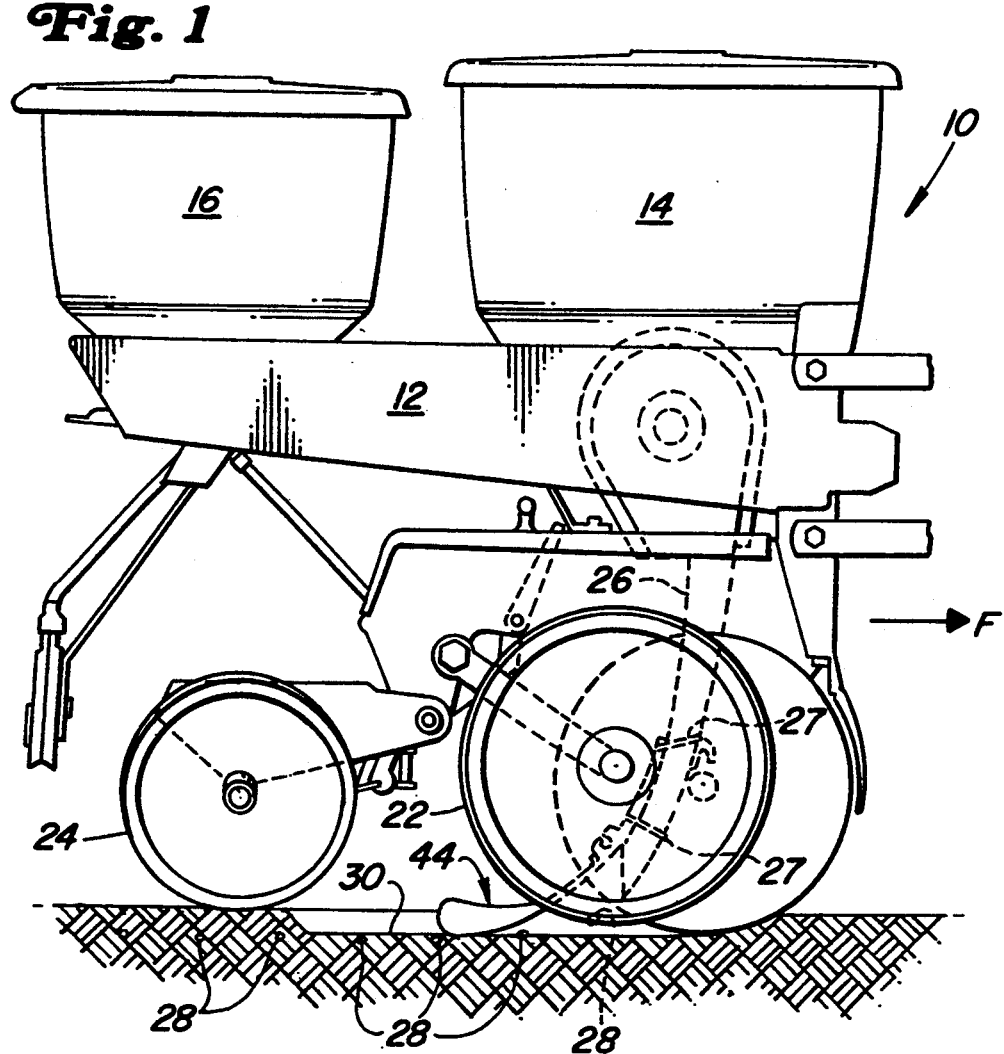
FIG. 1—is a side elevation view of a typical planting unit.

Referring now to FIG. 1, therein is shown a planting unit 10 to be drawn across a field in a forward direction as indicated by "F". The planting unit 10 generally includes a main frame 12 supporting the following components: A seed hopper 14 and a fertilizer hopper 16; a seed metering unit 18 which receives kernels from seed hopper 14; a furrow opening device 20; a gage wheel assembly 22 pivotally connected to the main frame 12 providing various planting positions with respect to the furrow opening device 20; a furrow closing device 24 which covers the deposited kernels with soil and a seed boot 26 which receives kernels 28 from the seed metering unit 18 and directs them into the opened furrow 30. The resilient seed firming member 44 is shown in a flexed position. The flex is caused by or the result of a portion of the weight of the planter forcing member 44 against the soil. Other means such as springs may be used to apply pressure to the member 44 at the bottom of the furrow.

Figure 2:
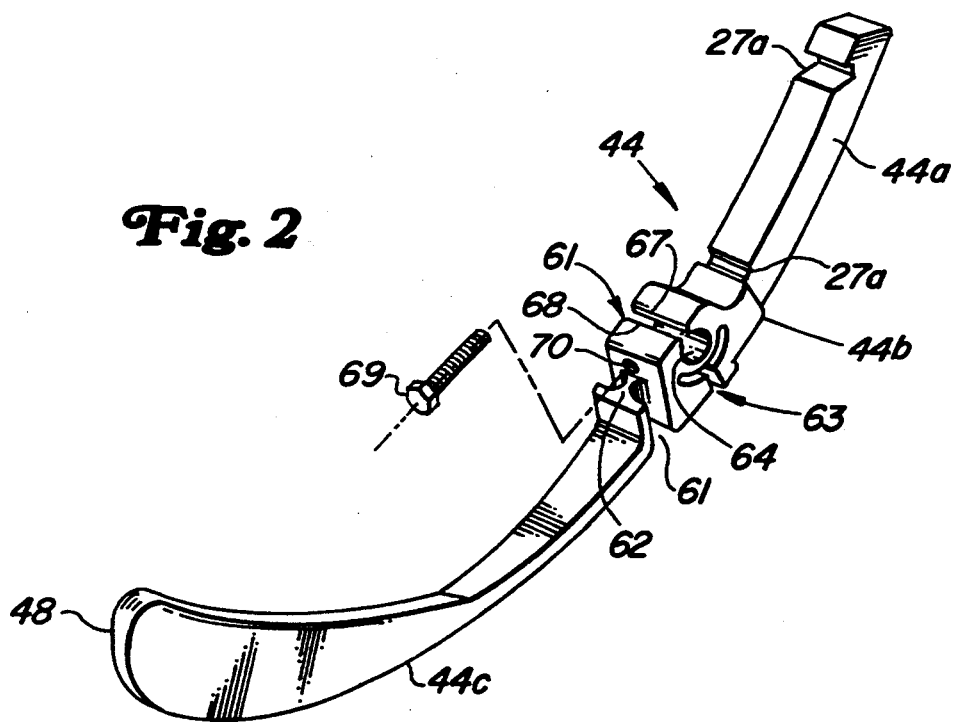
FIG. 2—is a perspective view of the improved seed firming device of this invention.

Referring to FIG. 3, an enlarged view of the seed deposit area is shown, with a resilient seed firming attachment 44 fastened by cinching straps 27 and recesses 27a to the seed boot 26. The seed firming attachment or device may also be attached by other means to other suitable positions on the planter assembly to permit flexing and resist the forces applied by the soil when the attachment is flexed. The seed firming attachment 44 is located in a position trailing the discharge opening 46 of the seed boot 26. The resilient seed firming attachment 44 may have the shape generally as shown in FIG. 2 wherein the lowermost portion 44c is shaped to conform to the furrow configuration at the free end which is in the bottom of the furrow. The first section of the seed firming attachment 44 may be and as shown in FIG. 2 is of a rectangular shape and secured to the seed tube. The second or middle section 44b of the seed firming attachment is the flexible portion and the third section 44c is the pressure applying section which is inflexible and is made to generally conform to the furrow configuration. The length of the seed firming attachment 44 from the exit of the seed tube to the end 48 of the section 44c, is sufficient to accommodate all planting depths desired. Other geometric configurations of the seed firming attachment may be utilized to accomplish the function of proper seeding firming. However, the form shown in this embodiment is believed to be the preferred form.

The seed firming attachment 44 may be formed from a plastic or metal member comprising essentially three sections with the center section being flexible. The seed firming attachment is best formed of one piece to perform its seed firming function. The first section 44a, including means for securing the attachment to the seed tube or the planter, is inflexible or rigid. The second or middle section 44b is both horizontally and laterally flexible and may be forced by pressure into a flexed or curved position in either direction. The flexing section 44b needs adequate memory to return to its un-flexed position when flexing pressure is removed. The third section 44c, including the second or free end, also is rigid and does not flex. The third section needs to be formed from smooth and abrasion resistant material for best operation.

As depicted in FIG. 1 and 3, the furrow opening device 20 has formed an opened furrow 30 leaving soil residuals 34 lying in the furrow apex 36 of opened furrow 30. The kernels 28 deposited between the resilient seed firming attachment 44 and the discharge opening 46 of the seed boot 26 are lying on the soil above the furrow apex 36 as shown in FIG. 3, and are not located at the desired planting depth and/or in the proper moisture for the best on germination. As the planting unit continues its forward progress, the resilient seed firming attachment 44 is drawn through the opened furrow 30 applying a downward force 52 into the furrow apex. Thus, the soil residuals 34 are compacted, substantially reducing if not totally eliminating air pockets, and the kernels 28 are firmly positioned into the furrow apex. The kernels are thus all positioned at a uniform depth at the best moisture level for uniform emergence.

As shown in FIG. 2, the flexible action of the second section 44b of this improvement is variable in both, i.e. lateral or horizontal and vertical directions of flex. The amount of lateral flex may be and is controlled by the depth of the cut-out portion 61 leaving the web 62 as the connection between the flexible or second section 44b and the third section 44c. The configuration of this web may be varied depending upon the materials used and the amount of horizontal flex desired. The second or flexible section 44c may be generally rectangular as shown or any other shape which will permit the control of the flexible actions as described herein.

The vertical flex and the resultant downward pressure on the seed in the bottom of the furrow, needs to be controlled and varied as soil and moisture conditions vary. In heavy damp soils, the down pressure 52 necessary to firm the seed is different from the down pressure required to firm the seed in dry, lighter soils. The variables determining the pressure required consist of the type of soil and the moisture content.

These variables require variable down pressure, yet the pressure needs to be controlled in some manner in the flexible section 44b. The flexibility limits are enhanced by providing the cut-out 63 and 64 in the flexible section 44c, thus the flexible member can flex in either vertical direction, i.e. up or down until the faces 65 and 66 come into contact and resist further movement. The flexible movement in the opposite direction without other restrictions can continue until the faces 67 and 68 come into contact. The amount of flex within these limits must be controlled to ensure the proper down pressure. The limits are within the range of flex of section 44b permitted by the cut-outs 63 and 64. These cut-outs 63 and 64 and web 62 are curved or flared to reduce the stress points in the material as it flexes, thereby reducing the possibility of fracture.

The amount of flex and resultant down pressure is controlled in this embodiment by the use of a flat face bolt 69 threaded through hole 70 in the flexible portion 44c. The bolt 69 abuts the wall of cavity 64 and limits and fixes at a predetermined and controlled level the vertical flex and the resultant down pressure on the seeds.

The shape of the seed firming attachment is such that it reduces seed bounce as described in my co-pending application Ser. No. 08/137,844. The lateral forces generated by the section 44c working against the soil at the bottom of the furrow, operate and cause 44c to follow the bottom of the furrow to help maintain the seed tube 26 in a lateral position directly over the center of the furrow to improve seed drop. The addition of cut-out 61 and the neck 62 allows this lateral action and also lets the seed firming device easily follow variations in the furrow which are the result of lateral variations in the path of the planter. As noted about the cut-outs for this material the resultant form should be curved in nature to minimize stress and possible fracture.

Having described the preferred embodiment, other features of the present invention will undoubtedly occur to those versed in the art, as will numerous modifications and alterations in the embodiments of the invention illustrated, all of which may be achieved without departing from the spirit and scope of the invention as defined in the appended claims.

What is claimed is:

1. A planting assembly having a furrow opening mechanism, a seed dispensing means, including a seed tube for directing the seeds downwardly and rearwardly as the planting assembly moves forward, and structure for guiding and firming seeds in the furrow as seeds are deposited, comprising:

a flexible member with first and second ends;

means for attaching and supporting said first end of said flexible member on the planting assembly with the second end of said flexible member extending downwardly and rearwardly applying downward pressure in the bottom of the furrow to firm the seeds in the soil;

said flexible member includes a first, second and third section;

the first section, which includes said first end, being inflexible, the second section of said flexible member being flexible and located between said first and said third sections, said second section including means for varying the flex of said second section, and the third section, which includes said second end, is inflexible.

2. The invention in accordance with claim 1, wherein said means for varying the flex of the second section of said flexible member are cut-outs in the second section.

3. The invention in accordance with claim 2, wherein said means for varying the flex of said second section of said flexible member includes means for flex at a predetermined value.

4. The invention in accordance with claim 1, wherein said third section of said flexible member conforms to the bottom of the furrow.

5. The invention in accordance with claim 1, wherein said third section has a width sufficient to assist the seed tube in preventing the bounce of seeds in the furrow.

6. The invention in accordance with claim 1, wherein said third section has a cross-section equal to a width of the burrow.

7. The invention in accordance with claim 1, wherein said flexible member flexes between said first and second ends due to the weight of the planting assembly forcing the flexible member against the soil at the bottom of the furrow.

8. The invention in accordance with claim 1, wherein said second section of said flexible member flexes sufficiently to permit said third section to become horizontal at the bottom of the furrow.

9. The invention in accordance with claim 3, wherein said second section of said flexible member has a memory which returns the second section to an un-flexed state when flexing force is removed.

10. The invention in accordance with claim 1, wherein said means for supporting the first end of said flexible member on said seed tube assembly and retaining said flexible member attached to the assembly resist the forces applied to the third portion of said flexible member by the resistance of the soil against the weight and lateral movement of the planting mechanism.

11. The invention in accordance with claim 11, wherein said means for retaining said flexible member are straps removably attached to said seed tube assembly.

12. The invention in accordance with claim 1, wherein said flexible member is a unitary member made of plastic.

13. The invention in accordance with claim 3, wherein said means for controlling the flex of said second section includes a position adjustable rigid member inserted in one of said geometric cut-outs to limit the flex of said cut-out.

* * * * *